United States Patent [19]
Grewe

[11] Patent Number: 6,055,466
[45] Date of Patent: Apr. 25, 2000

[54] VEHICLE RESPONSIVENESS IN AN ELECTRIC VEHICLE

[75] Inventor: Timothy Michael Grewe, Endicott, N.Y.

[73] Assignee: Lockheed Martin Corp., Johnson City, N.Y.

[21] Appl. No.: 09/369,085

[22] Filed: Aug. 5, 1999

[51] Int. Cl.[7] .................................................. G60L 9/00
[52] U.S. Cl. ........................... 701/22; 701/35; 180/65.1; 180/65.8; 395/821; 395/829; 395/833; 395/843
[58] Field of Search .................................. 701/22, 35, 1, 701/101, 102; 180/65.8, 65.1; 395/821, 843, 829, 833, 206.44, 206.45

[56] References Cited

U.S. PATENT DOCUMENTS

| | | | |
|---|---|---|---|
| 5,418,399 | 5/1995 | Klaue ....................................... | 290/1 R |
| 5,730,238 | 3/1998 | Tamaki et al. .......................... | 180/65.8 |
| 5,828,201 | 10/1998 | Hoffman, Jr. et al. ................. | 320/104 |
| 5,869,950 | 2/1999 | Hoffman, Jr. et al. ................. | 320/103 |

*Primary Examiner*—William A. Cuchlinski, Jr.
*Assistant Examiner*—Yonel Beaulieu
*Attorney, Agent, or Firm*—W. H. Meise; G. H. Krauss

[57] ABSTRACT

An electric vehicle (10) includes a traction motor (26) which drives the wheels (30a, 30b) by way of a differential (28), if desired. The traction motor (26) is controlled by a controller (24) which responds to torque command signals, to cause the motor (26) to produce the commanded torque. An accelerator pedal (12) is coupled to a position transducer (16) which converts pedal position into digital signals. The digital signals representing pedal position are applied as addresses to a memory (22) to access the stored signals. The memory is preprogrammed with torque signals representing the torque desired at a given pedal depression. In a preferred embodiment, the preprogrammed signals represent torques which are monotonically related to the pedal position, although some deviation may be acceptable in small portions of the operating range. The memory signals resulting from a given pedal position are applied to the controller, for causing the controller to command the motor to produce the specified torque. The programmed values can be adjusted to provide the impression of a more or less "powerful" or "lively" vehicle. In one embodiment, the memory (22) can be reprogrammed on-the-fly by use of an auxiliary memory (40).

5 Claims, 1 Drawing Sheet

VEHICLE RESPONSIVENESS IN AN ELECTRIC VEHICLE

Field of the Invention

This invention relates to electrically driven vehicles, and more particularly to arrangements for controlling the vehicle acceleration.

BACKGROUND OF THE INVENTION

The internal combustion engine has been used almost exclusively for the propulsion of automobiles and other terrestrial vehicles for about a century. The control arrangements, including a brake pedal centered between a clutch pedal and an accelerator pedal (accelerator), together with a transmission gear control lever or stick, have remained substantially the same for more than 70 years, although the use of automatic transmissions has eliminated the need for clutch pedals on those vehicles so equipped, and has modified the function of the gear lever. The function of the gear lever has in some cases been taken over, or partially taken over, by pushbuttons which, in various operating modes, control the gear ratio or set of gear ratios. These control arrangements are ingrained in the driving population, and must be taken into account when devising controls for electrically driven automobiles, whether these be pure-electric or hybrid electric.

Improved control arrangements are desired for vehicles powered in whole or in part by electric motors.

SUMMARY OF THE INVENTION

A method, according to an aspect of the invention, for operating an electric vehicle, includes the steps of preprogramming a sequence of memory locations of a digital memory associated with the vehicle with torque signals representing the magnitude of the torque which is to be applied to the wheels of the vehicle for propulsion thereof. The torque signals preprogrammed into the memory represent one of (either) a monotonically increasing and a monotonically decreasing value of torque as a function of sequential addressing of the memory locations, so that sequential addressing of the memory locations results in the reading of signals which either increase or decrease monotonically. The method includes the production of a position signal representing the position of the accelerator pedal of the vehicle, which may be performed by as simple an arrangement as a variable resistor connected to the pedal, or possibly by a transducer such as those found in a computer mouse. According to an aspect of the invention, the pedal position signal is converted into digital address signals, and the digital address signals are applied to the memory for, at any particular time, addressing a memory location corresponding to the current pedal position as currently identified by the digital address signals. In response to the current torque signal read from the memory, a traction motor of the vehicle is operated at the corresponding torque.

In one mode of the invention, the preprogramming step includes the step of preprogramming the memory locations with torque signals which increase in magnitude linearly with sequence address. As an alternative, the memory locations can be programmed with values which increase in value nonlinearly. The preprogramming can be performed on-the-fly, while the vehicle is in motion.

A vehicle, according to another aspect of the invention, includes a drive wheel and an electric traction motor connected to the wheel. A controller is coupled to the motor, for driving the motor with electrical power, for causing the motor to produce torque in response to torque command signals applied to the controller. A digital memory includes a plurality of memory locations. The memory is preprogrammed at a plurality of sequential address locations, over a principal portion of the vehicle control range, with one of (either) monotonically increasing and monotonically decreasing torque command signals. An accelerator, which may be operated by a vehicle operator, is provided. A position sensing transducer is coupled to the accelerator, for generating memory address signals in response to the position of the accelerator. An arrangement couples the memory address signals from the transducer to the memory for addressing memory locations thereof, for thereby producing the torque command signals, for thereby causing the motor to drive the vehicle with torque selected in response to the position of the accelerator. In a particular embodiment of the invention, the torque signals preprogrammed into the memory at sequentially addressable memory locations are linearly related to torque, and in another embodiment they are nonlinearly related.

DESCRIPTION OF THE INVENTION

Figure 1:
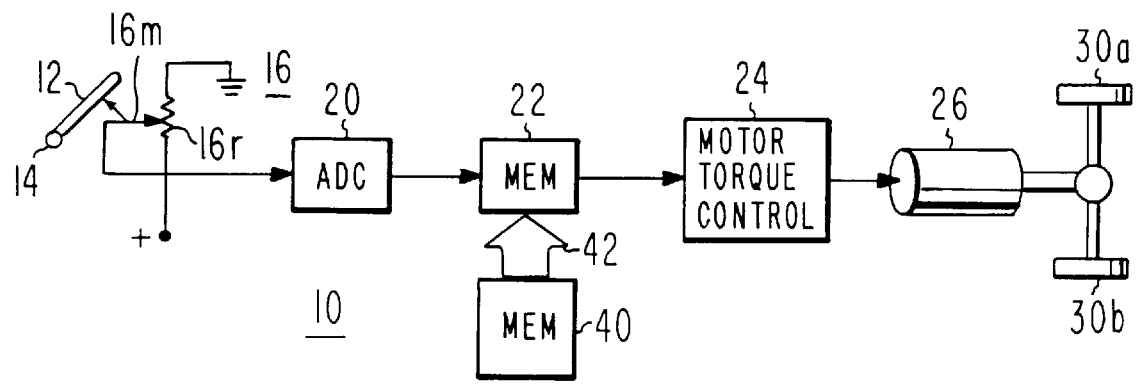
FIG. 1 is a simplified block diagram of a vehicle system according to an aspect of the invention.

In FIG. 1, a vehicle 10 includes an accelerator pedal (accelerator) 12 hinged about an axis 14. Pedal 10 is connected to the movable wiper 16$m$ of a resistor 16$r$ of a position sensor 16. More particularly, resistor 16$r$ is connected at one end to ground and at the second end to a source (+) of voltage. Together, resistor 16$r$ and wiper 16$m$ act as a potentiometer, producing a wiper voltage which varies with the amount of depression or position of the pedal 12.

Figure 2:
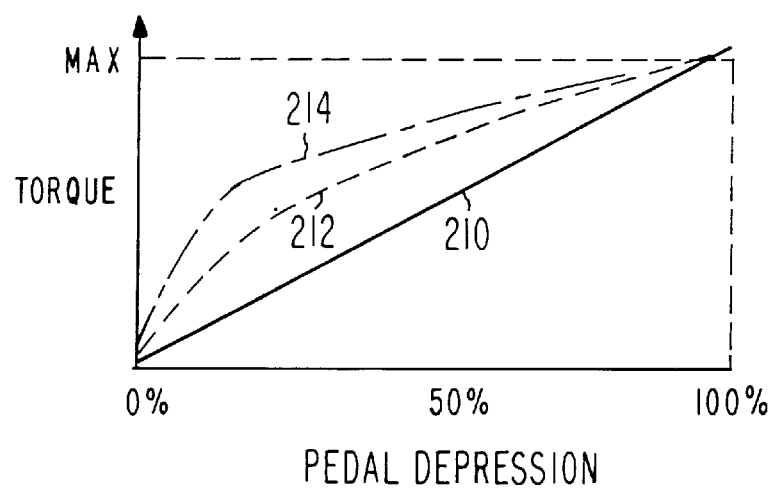
FIG. 2 illustrates possible pedal-position-to-torque transfer characteristics which may be used in accordance with the invention.

The voltage representing the pedal position is applied from sensor 16 analog-to-digital converter (ADC) 20. The analog-to-digital converter 20 converts the pedal-position voltage into a pedal-position-indicating digital signal. The pedal-position-indicating digital signal, in turn, is applied as an address input to a digital memory 22. Memory 22 is preprogrammed with at least one page of information representing a conversion from pedal position to motor torque. The conversion information is in the form of a signal associated with each memory position or location which can be addressed by the pedal-position-indicating digital signal. The signals are stored in the memory in such a way that the torque represented by the signal at each address is no less the torque represented by the signal at addresses associated with less depression of the pedal 12. In other words, as the pedal 12 is depressed, memory locations are addressed in a sequence, and the signals stored in successively addressed memory locations are monotonically related, which is to say that the rate of change never reverses. A greater depression of the accelerator pedal always reads a signal from memory 22 which represents a torque which is greater than, or at least no less than, torques represented at lesser depressions of the pedal 12. FIG. 2 illustrates a particular torque-versus-pedal depression plot 210, which may be used as a default characteristic, in which the torque read from memory is linearly related to the pedal depression or pedal position.

The signal read from memory 22 of FIG. 1 is applied to a motor controller illustrated as a block 24. Block 24 converts the commanded torque into appropriate power signals for a traction motor 26. Traction motor 26 produces torque in response to the commands from controller 24, and the torque is applied through a differential gearing arrangement (if desired) to one or more drive wheels 30a and 30b.

The controller of block 24 may be of any conventional type, such as are described, for example, in U.S. Pat. No. 5,828,201, issued Oct. 27, 1998 in the name of Hoffman et al. and U.S. Pat. No. 5,869,950, issued Feb. 9, 1999 in the name of Hoffman et al.; allowed patent applications Ser. No. 09/044,669, filed Mar. 20, 1998 in the name of Lyons et al., Ser. No. 09/044,671 filed Mar. 20, 1998 in the name of Lyons et al., and Ser. No. 09/039,895 filed Mar. 16, 1998 in the name of Gataric et al.; and in patent applications Ser. No. 09/192,645, filed Nov. 16, 1998 in the name of Jones et al., Ser. No. 09/044,670, filed Mar. 20, 1998 in the name of Lyons et al., Ser. No. 09/044,676, filed Mar. 20, 1998 in the name of Lyons et al., Ser. No. 09/039,896, filed Mar. 16, 1998 in the name of Lyons, Ser. No. 09/177,011, filed Oct. 22, 1998 in the name of Chady et al., Ser. No. 09/080,148, filed May 18, 1998 in the name of Lyons et al., and Ser. No. 09/266,646, filed Mar. 16, 1999 in the name of Gataric. Series-type hybrid electric buses experimenting with or using some of this technology are currently in operation as, for example, transit buses in New York.

A major advantage of the described arrangement is that the "liveliness" or "feel" of the vehicle can be changed to suit the user by simply programming the memory 22 of FIG. 1 with a different sequence of torque values. Plot 212 of FIG. 2 illustrates a plot which would have a "livelier" feel than plot 210, and use of plot 214 would be livelier still. This change would be manifest because, the torque applied to the wheels would be greater for plots 212 and 214 at a lesser depression of the accelerator pedal 12 than for plot 210. This would result in a greater vehicle acceleration, thereby giving the impression of "more power."

In FIG. 1, a further memory 40 (which may actually be a part of memory 22, but which is illustrated separately for simplicity) is illustrated as being connected by a path 42 to memory 22. Memory 40 accommodates one or more pages of conversion characteristics, such as 212 and 214 of FIG. 2. It is desirable to do any reprogramming of active memory 22 an entire page at a time, so as to avoid having discontinuities in the transfer function as might occur if each memory address of memory 22 were separately loaded by hand, as by selection from a keyboard. The loading of the memory 22 is always one memory location at a time when conventional memories are used, but when the entire set of values, corresponding to one of plots 210, 212, or 214, is transferred from memory 40 into memory 22 as a result of a single command, so as to overwrite the values previously existing therein, the transfer is instantaneous insofar as a human user is concerned. Thus, a plot of the transfer characteristic would not contain a discontinuity due to the length of time required for individual human programming of each separate memory location. This is not to say, however, that the transfer characteristic could not, once loaded into memory 22, cannot have one or more discontinuities, if desired for some particular purpose.

While the plots stored in memory 22 are illustrated as monotonically increasing in plots 210, 212, and 214, those skilled in the art know that the plots may also be monotonically decreasing, and that appropriate conversion may be made an inherent part of the controller 24.

Other embodiments of the invention will be apparent to those skilled in the art. For example, while the sensor 16 has been described as an analogue-voltage device requiring an analog-to-digital converter 20, the sensor may instead be a digital position encoder which converts the pedal position directly into a digital signal, without the necessity for a discrete ADC such as 20. While the memory locations have been described as sequentially addressed, they may be nonsequential or even in random order, so long as there is a conversion arrangement which converts the pedal position signals into addresses which contain the torque command signals in the desired monotonic sequence. Similarly, having a non-monotonic sequence at the upper end of the torque range might be acceptable, so long as the bottom end of the torque range was monotonic.

Thus, a method, according to an aspect of the invention, for operating an electric vehicle (10), includes the steps of preprogramming a sequence of memory (22) locations of a digital memory (22) associated with the vehicle (10) with torque signals representing the magnitude of the torque which is to be applied to the wheels (30a, 30b) of the vehicle (10) for propulsion thereof. The torque signals preprogrammed into the memory (22) represent one of (either) a monotonically increasing and a monotonically decreasing value of torque as a function of sequential addressing of the memory (22) locations, so that sequential addressing of the memory (22) locations results in the reading of signals which either increase or decrease monotonically. The method includes the production of a position signal representing the position of the accelerator pedal (12) of the vehicle (10), which may be performed by as simple an arrangement as a variable resistor (16r) connected to the pedal (12), or possibly by a position transducer, equivalent to those found in a computer mouse. According to an aspect of the invention, the pedal (12) position signal is converted (ADC 20) into digital address signals, and the digital address signals are applied to the memory (22) for, at any particular time, addressing a memory (22) location corresponding to the current pedal (12) position as currently identified by the digital address signals. In response to the current torque signal read from the memory (22), a traction motor (26) of the vehicle (10) is operated at the corresponding torque.

In one mode of the invention, the preprogramming step includes the step of preprogramming the memory (22) locations with torque signals which increase in magnitude linearly (210) with sequence address. As an alternative, the memory (22) locations can be programmed with values which increase in value nonlinearly (212, 214). The preprogramming can be performed on-the-fly, while the vehicle (10) is in motion.

A vehicle (10), according to another aspect of the invention, includes a drive wheel (30a, 30b) and an electric traction motor (26) connected to the wheel (30a, 30b). A controller (24) is coupled to the motor (26), for driving the motor (26) with electrical power, for causing the motor (26) to produce torque in response to torque command signals applied to the controller (24). A digital memory (22) includes a plurality of memory locations. The memory (22) is preprogrammed at a plurality of sequential address locations, over a principal portion of the vehicle (10) control range, with one of (either)monotonically increasing and monotonically decreasing torque command signals. An accelerator (12), which may be operated by a vehicle (10) operator, is provided. A position sensing transducer (16, 20) is coupled to the accelerator (12), for generating memory (22) address signals in response to the position of the accelerator (12). An arrangement (connection 21) couples the memory address signals from the transducer (16, 20) to the memory (22) for addressing memory locations thereof, for thereby producing the torque command signals, for thereby causing the motor (26) to drive the vehicle (10) with torque selected in response to the position of the accelerator. In a particular embodiment of the invention, the torque signals preprogrammed into the memory (22) at sequentially addressable memory locations are linearly related (210) to torque, and in another embodiment they are nonlinearly related (212, 214).

What is claimed is:

1. A method for operating an electric vehicle, said method comprising the steps of:

preprogramming a sequence of memory locations of a memory associated with said vehicle with torque signals representing the magnitude of the torque which is to be applied to the wheels of said vehicle for propulsion thereof, said torque signals preprogrammed into said memory representing, at least over a principal portion of the low-torque end of control, one of a monotonically increasing and a monotonically decreasing value of torque as a function of sequential addressing of said memory locations;

producing a position signal representing the position of the accelerator of said vehicle;

converting said position signal into digital address signals, and applying said digital address signals to said memory, for addressing that one of said memory locations which is currently identified by said digital address signals; and in response to the current torque signal read from said memory, operating a traction motor of said vehicle at the corresponding torque.

2. A method according to claim 1, wherein said preprogramming step includes the step of preprogramming said memory locations with torque signals which increase in magnitude linearly with sequence address.

3. A method according to claim 1, wherein said preprogramming step includes the step of preprogramming said memory locations with torque signals which increase in magnitude nonlinearly with sequence address.

4. A method according to claim 1, further comprising the steps of:

performing said preprogramming of said memory while said vehicle is in motion.

5. A vehicle, comprising:

a drive wheel;

an electric traction motor connected to said wheel;

a controller coupled to said motor, for driving said motor with electrical power, for causing said motor to produce torque in response to torque command signals applied to said controller;

a memory including a plurality of memory locations, said memory being preprogrammed at a plurality of sequential address locations, over a principal portion of the vehicle control range, with one of monotonically increasing and monotonically decreasing torque command signals;

an accelerator which to be operated by a vehicle operator;

a position sensing transducer coupled to said accelerator, for generating memory address signals in response to the position of said accelerator; and means for coupling said memory address signals to said memory for addressing memory locations thereof, for thereby producing said torque command signals, for causing said motor to drive said vehicle with torque selected in response to the position of said accelerator.

* * * * *